Patented July 9, 1940

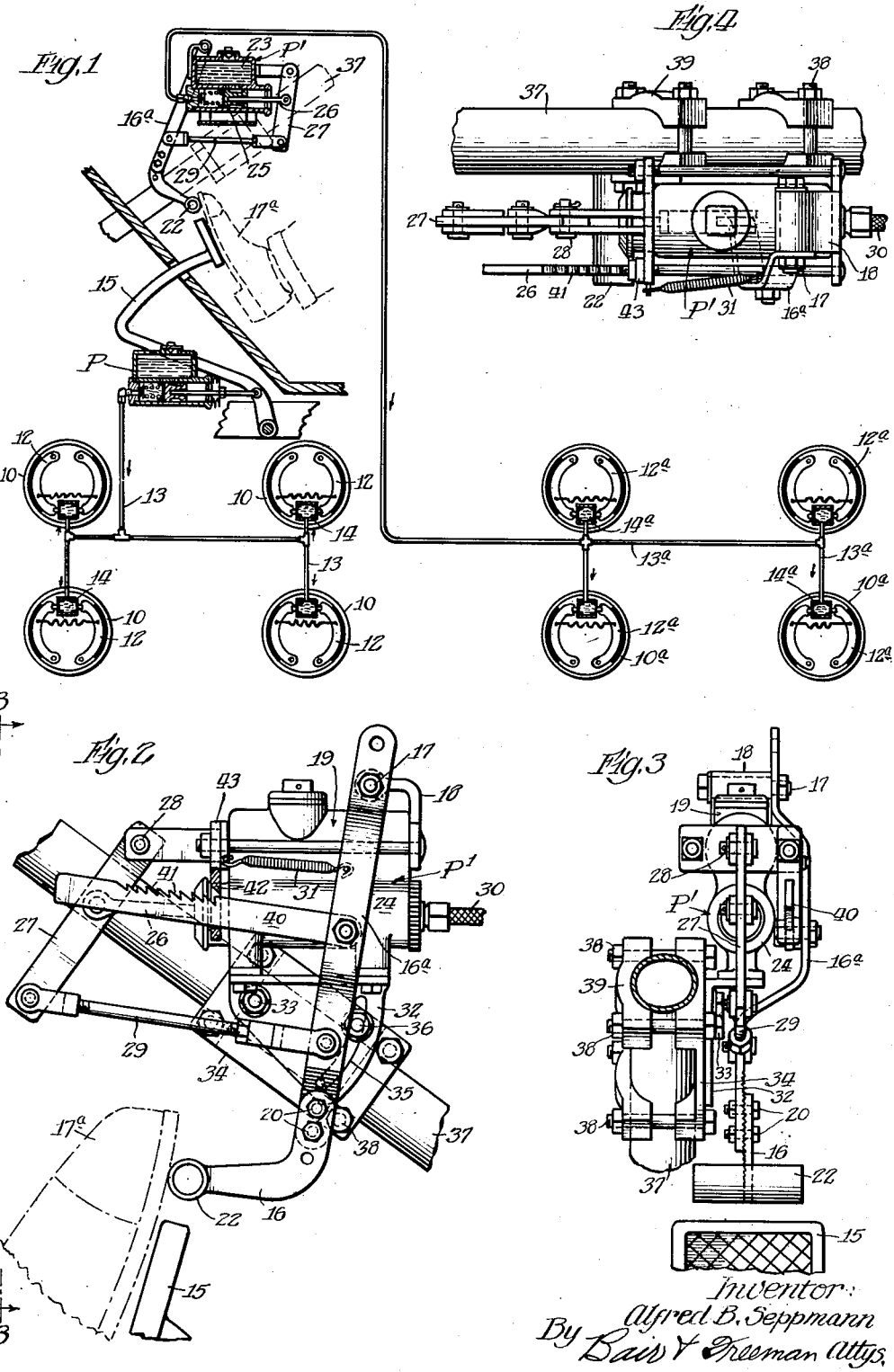

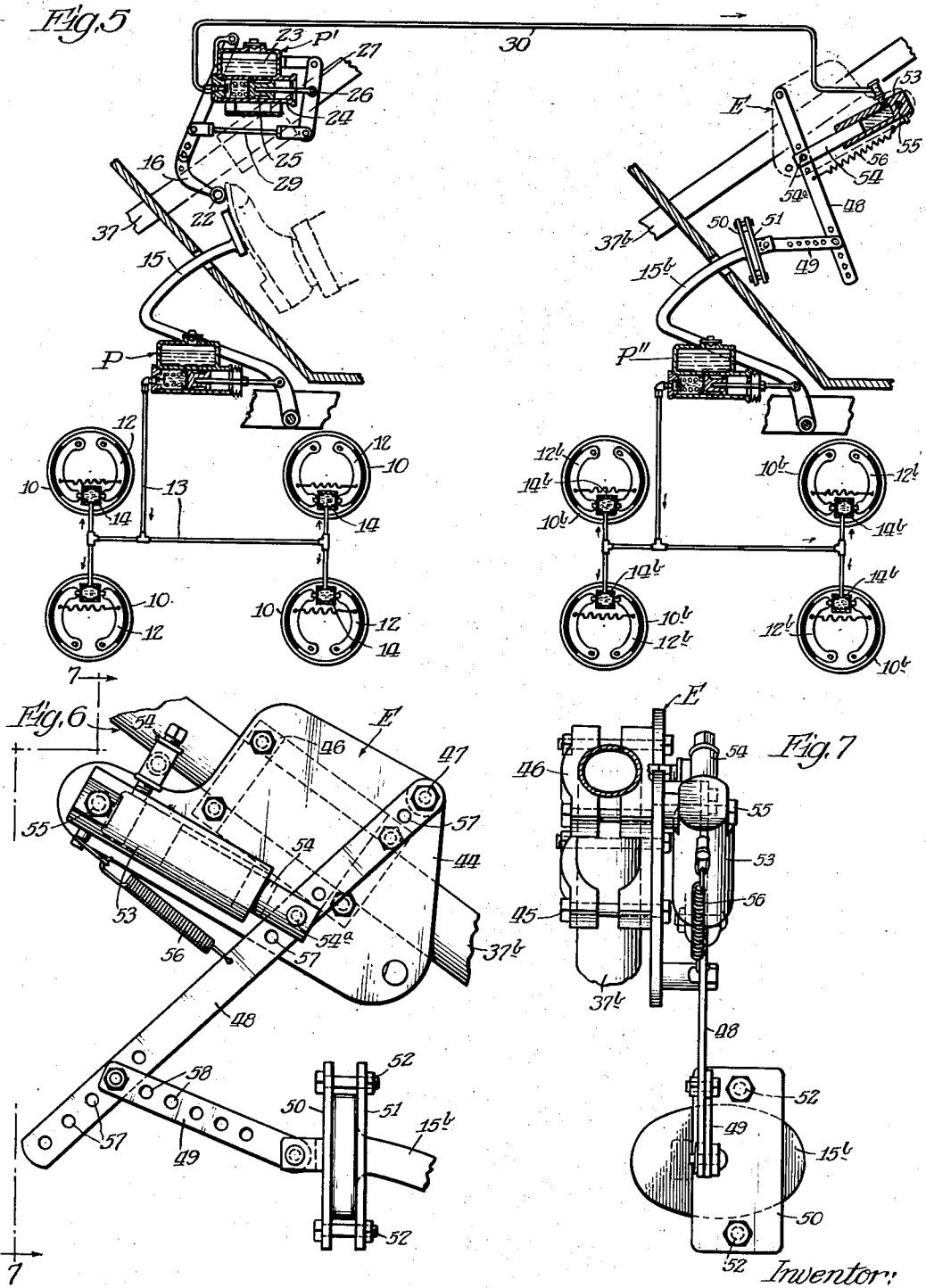

2,207,228

UNITED STATES PATENT OFFICE 2,207,228

BRAKE SYSTEM

Alfred B. Seppmann, Mankato, Minn.

Application July 18, 1938, Serial No. 219,792

15 Claims. (Cl. 188—3)

An object of my invention is to provide a brake system of simple, durable and inexpensive construction particularly for use with trailers or other towed vehicles.

A further object is to provide a brake system in which a power unit is mounted in an automobile or the like and includes an oil pump for pumping oil to the brake system of a trailer or to an energizing unit which can be mounted in an automobile or the like being towed which already has a brake mechanism thereon including a depressible brake pedal adapted to be manually operated normally and operated by my energizing unit when the second automobile is being towed.

Another object is to provide my power unit of such construction that it can be readily attached to any existing type of automobile without interference with the operation of the brake pedal or other parts of the brake mechanism thereof.

More particularly it is my object to provide a power unit which can be used in my brake system and which is readily mounted in position with respect to the brake pedal of an automobile so that the operator's foot, when depressing said brake pedal, will also operate the power unit.

A further object is to provide an energizing unit which likewise can be readily mounted in a towed vehicle and connected with the brake pedal thereof regardless of the relative positions between the brake pedal and the steering column of the towed vehicle on which the energizing unit is mounted.

Still a further object is to provide power and energizing units which can be readily mounted on the steering columns of automobiles and the like and adjusted for proper operation in a minimum of time and with assurance of continued proper operation thereafter.

Still another object is to provide the power unit with a locking means to enable the operator to lock the brakes of a trailer or the like in applied position without having to retain his foot on the actuator of the power unit.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a diagrammatic view of my brake system as applied to an automobile or the like and to the brakes of a trailer.

Figure 2 is a side elevation of the power unit of my brake system as viewed from the side opposite the one shown in Figure 1.

Figure 3 is a rear elevation thereof looking in the direction of the arrows 3, 3 adjacent Figure 2.

Figure 4 is a plan view of the power unit in the position shown in Figure 2.

Figure 5 is another diagrammatic view of my brake system as applied to an automobile or the like and to the brakes of a towed vehicle, such as a second automobile being towed behind the first one.

Figure 6 is a side elevation of the energizing unit used in connection with my brake system shown in Figure 5, this figure being taken from the opposite side as compared to the right half of Figure 5; and Figure 7 is a rear elevation of Figure 6 looking in the direction of the arrows 7, 7 thereadjacent.

On the accompanying drawings I have used the reference numeral 10 to indicate the brake drums of an automobile or the like. Brake shoes 12 are adapted to coact therewith when oil is supplied from a pipe 13 to the hydraulic cylinders 14 of the brakes. A power unit P is provided for supplying oil to the pipes 13 whenever a brake pedal 15 connected therewith is depressed as shown in Figure 1. The foregoing description is of the usual hydraulic brake system now in general use on automobiles.

My brake system includes a power unit P' having an actuating lever 16 adapted to be engaged by the operator's foot 17a and depressed simultaneously with the brake pedal 15 as shown in Figure 1. The actuating lever 16 is formed in two parts, one of which is indicated at 16a and is pivoted at 17 to a bracket 18. The bracket 18 is supported on a body portion 19 of my power unit P'.

The lever portions 16 and 16a are adjustably connected together by removable bolts 20 which can be placed in different spaced openings of the levers. The faces of the levers are serrated as illustrated in Figure 3 to insure alignment of the levers after the bolts 20 are tightened and to prevent accidental slippage of one lever relative to the other after relative adjustment has been effected. The lever 16 terminates in a foot engageable portion 22 which is preferably located (in the deenergized position of the automobile brakes) slightly back of the pedal 15, as shown in Figure 2. Accordingly when the operator depresses the pedal 15 he will first engage and depress the lever 16.

The body portion 19 includes a reservoir 23 and a pump cylinder 24. The pump cylinder 24 has therein a pump piston 25. It is connected by a stem 26 to a lever 27. The lever 27 is pivotally mounted at 28 and is operatively connected by a link 29 to the lever 16a. Accordingly depression of the lever 16 will result in pumping oil from the pump cylinder 24 to a flexible oil conduit 30. Whenever the lever 16 is released, a spring 31 will return it to the deenergized position of Figure 2.

The body portion 19 of my power unit P' is mounted on a bracket 32. The bracket 32 is pivoted at 33 to a clamp plate 34. The bracket 32 has an arcuate slot 35 through which a clamp bolt 36 extends. The clamp plate 34 is adapted to be secured to the steering column 37 of the automobile having the brake drums 10 by clamp bolts 38 and yokes 39 as shown in Figures 2, 3 and 4.

Pivoted to the lever 16a is a lock bar 40. The bar 40 has a plurality of teeth 41 adapted to coact at times with a tooth 42 of a bracket 43. While the lever 16 is depressed, the lever 40 can be raised manually until one of the teeth 41 coacts with the tooth 42 after which release of pressure on the lever 16 will permit the spring 31 to swing the lever 16a backwardly. The teeth 41 and 42 are thereby frictionally engaged and will thereafter be retained engaged by such friction. Subsequent pressure on the foot engageable portion 22 of the lever 16 will result in the lock bar 40 dropping to inoperative position, whereupon the lever 16 can be released by the operator removing his foot from the lever.

The conduit 30 of my power unit P' is adapted for connection with the brake cylinders 14a of a trailing vehicle by connection with piping 13a thereof for applying the brakes 12a of the trailing vehicle against the brake drums 10a thereof whenever the brake mechanism of the automobile having the brake pedal 15 is energized. My power unit can be conveniently mounted relative to the steering column 37 in position so that it needs no connection whatever to the brake system of the automobile but is merely positioned so that when its brake pedal is depressed, the actuating lever 16 is also depressed. The clamp plate 34 can be slid longitudinally of the steering column 37 and locked in any position relative thereto by tightening the bolts 38. The power unit P' can be tipped as desired, the levers 16 and 16a can be lengthened or shortened as desired and the link 29 being adjustable in length, all permits the positioning of the foot engageable portion 22 in the desired position with respect to the position of the pedal 15. The lever 16a is so arranged that the foot engageable portion 22 swings in an arc of a circle and always remains a short distance above the upper edge of the pedal during the brake applying movement, the extremes of which are shown in Figures 1 and 2.

Where the trailing vehicle happens to be another automobile having its own brake system, as indicated at 10b, 12b, 13b and 14b in Figure 5 and which system also includes a brake pedal 15a and a power unit P'', I have provided an energizing unit E for connection to the oil conduit 30. The energizing unit E includes a clamp plate 44, which is clamped to the steering column 37b of the trailing automobile by clamp bolts 45 and clamp yokes 46. The energizing unit E has a pivot at 47 on which an actuating lever 48 is pivoted. The lever 47 is connected by a link 49 to a pair of clamp plates 50 and 51. The plates 50 and 51 are adapted to be clamped by clamp bolts 52 to the brake pedal 15b.

Pivotally mounted on the energizing unit E is a cylinder 53. A plunger 54 is mounted thereon and connected with the lever 48 by a pin 54a. The conduit 30 connects with a fitting 54b of the cylinder 53. The cylinder itself is pivoted to the plate 44 as at 55. A return spring 56 is provided for normally keeping the lever 48 in position for deenergization of the brake system of the trailing automobile.

The energizing unit (due to its construction including a plurality of openings 57 and 58 in the levers 48 and the link 49) can be universally connected with all types of trailing automobiles so that their brakes can be controlled from a first automobile pulling the trailing automobile as desired. The clamp plate E can be slid longitudinally of the steering column 37b and clamped in any desired position. The leverages and distances between the parts can all be adjusted by selecting the proper openings 57 and 58 as required by any particular installation. These adjustments can be made in a minimum of time and likewise the power unit P can be clamped in position or removed quickly whenever desired.

I have provided a brake system which is applicable to either an ordinary hydraulic brake system for a trailing vehicle having no power unit or to a hydraulic or mechanical brake system of a vehicle when it includes a brake pedal for energizing the brakes. In the first instance the energizing unit E need not be used while in the second instance it is interposed between the hydraulic conduit 30 and the brake pedal 15b which is to be manually actuated as distinguished from hydraulically actuated, as are the cylinders 14 in Figure 1.

Some changes may be made in the construction and arrangement of the parts of my brake system without departing from the real spirit and purpose of my invention. It is therefore my intention to cover by my claims such modified forms of structure or use of mechanical equivalents as may be reasonably included within their scope.

I claim as my invention:

1. In a brake system, a power unit including an oil reservoir, an oil pump and a movable foot engageable actuator for said oil pump, said power unit including a locking means normally disengaged but manually engageable at will, said locking means being releasable, upon subsequent depression of said foot engageable actuator, means for mounting said power unit on the steering column of an automobile in position with said foot engageable actuator adjacent the brake pedal thereof and located with respect to the brake pedal so that the operator's foot, upon depressing said brake pedal, will also depress said actuator, and a hydraulic connection between said oil pump and the brakes of a vehicle coupled to said automobile.

2. In a brake system, a power unit including a movable foot engageable actuator and including a locking means normally disengaged but manually engageable at will, said locking means being releasable upon subsequent depression of said foot engageable actuator, means for mounting said power unit on the steering column of an automobile in position with said foot engageable actuator adjacent the brake pedal thereof and located with respect to the brake pedal so that the operator's foot, upon depressing said brake pedal, will also depress said actuator, and an operative connection between said power unit and the brakes of a vehicle coupled to said automobile.

3. In a brake system, a power unit including an oil reservoir, an oil pump and a movable foot engageable actuator for said oil pump. means for mounting said power unit on an automobile in position adjacent the brake pedal of said automobile and in such position relative thereto that the operator's foot when depressing said brake pedal will also depress said actuator, and a hydraulic connection between said oil pump and the brakes of a vehicle trailing said automobile.

4. In a brake system of the character described, a power unit including an oil pump and a movable foot engageable actuator therefor, means for mounting said power unit on the steering column of an automobile in position with said foot engageable actuator adjacent the brake pedal thereof so that the operator's foot when depressing the brake will also depress the actuator and a hydraulic connection between said oil pump and the brakes of a vehicle being towed by said automobile.

5. In a brake system of the character described, a power unit including an oil pump and a movable foot engageable actuator therefor, means for mounting said power unit on the steering column of an automobile in position with said foot engageable actuator adjacent the brake pedal thereof so that the operator's foot when depressing the brake will also depress the actuator, said means being slidable on said steering column, means for clamping it thereon against sliding movement and a hydraulic connection between said oil pump and the brakes of a vehicle being towed by said automobile.

6. In a brake system of the character described, a power unit including an oil pump and a lever therefor, a bracket for mounting said power unit on the steering column of an automobile in position with said lever adjacent the brake pedal thereof, said bracket being swingable to vary the inclination of said lever and being slidable on said steering column, means for clamping said bracket thereon against swinging and sliding movement and a hydraulic connection between said oil pump and the brakes of a vehicle being towed by said automobile.

7. In a brake system, a power unit, a clamp for attaching said power unit to the steering column of an automobile, said clamp being fixed relative thereto to any position to which it is slid, a supporting bracket pivoted to said clamp, means for fixing said supporting bracket against pivotal movement relative to said clamp, an oil pump supported on said bracket, an actuating lever therefor adapted for being engaged by an operator's foot when depressing the brake pedal of an automobile and a hydraulic connection between said oil pump and the brakes of a vehicle trailing said automobile.

8. In a brake system, a power unit, a support for supporting said power unit on the steering column of an automobile, a supporting bracket pivoted to said support, an oil pump supported on said bracket, an actuator lever therefor adapted for being engaged by an operator's foot when depressing the brake pedal of an automobile, means for fixing said supporting bracket against pivotal movement relative to said support after the actuator lever has been set at the proper working angle and a hydraulic connection between said oil pump and the brakes of a vehicle trailing said automobile.

9. In a brake system, a power unit, means for attaching said power unit to the steering column of an automobile, an oil pump supported on said means. an actuator lever therefor having a foot depressible portion adjacent the brake pedal of the automobile and a hydraulic connection between said oil pump and the hydraulic cylinders of the brakes of a vehicle trailing said automobile.

10. In a brake system, a power unit including an oil reservoir, an oil pump and a movable foot engageable actuator for said oil pump, means for mounting said power unit on the steering column of an automobile in position with said foot engageable actuator adjacent the brake pedal thereof and located with respect to the brake pedal so that when the operator's foot depresses the brake, it will first depress the actuator, an energizing unit for a vehicle trailing said automobile and having brake mechanism including a brake pedal, said energizing unit comprising a hydraulically operated actuator, a hydraulic connection between said actuator and said oil pump of said power unit and a lever operated by said hydraulically operated actuator and connected to said brake pedal of said vehicle.

11. In a brake system, a power unit including an oil pump and a movable foot engageable actuator for said oil pump, means for mounting said power unit on the steering column of an automobile in position for said foot engaging actuator to be engaged by the operator's foot when depressing the brake pedal of the automobile, a brake energizing unit for a vehicle trailing said automobile and having brake mechanism including a brake pedal, said energizing unit comprising a hydraulically operated actuator, a hydraulic connection between said actuator and said oil pump of said power unit and a lever operated by said hydraulically operated actuator and operatively connected with said brake pedal of said vehicle.

12. In a brake system, a power unit including an oil reservoir, an oil pump and a movable actuator lever for said oil pump, means for mounting said power unit on an automobile in position with said actuator lever adjacent the brake pedal thereof, an energizing unit for a vehicle trailing said automobile and having brake mechanism including a brake pedal, said energizing unit comprising a hydraulically operated actuator, a hydraulic connection between said actuator and said oil pump of said power unit and an operative connection between said hydraulically operated actuator and said brake pedal of said trailing vehicle.

13. In a brake system, a power unit including an oil pump and a movable foot engageable actuator for said oil pump, means for mounting said power unit on the steering column of an automobile in position with said foot engageable actuator adjacent the brake pedal thereof and located with respect to the brake pedal so that when the operator's foot depresses the brake, it will first depress the actuator, a clamp for mounting on the steering column of a trailing vehicle having a brake pedal, an oil cylinder supported thereon, a lever pivoted to said clamp, a piston in said oil cylinder and operatively connected with said lever, a clamp for mounting on said last-mentioned brake pedal, a link pivotally connected with the lever and the clamp, the pivotal connections of said link and said lever including a plurality of openings for selectively adjusting said energizing unit to different steering columns and brake pedals of trailing vehicles.

14. In a brake system, a power unit having a foot engageable actuator, means for mounting said power unit on an automobile in position for said foot engaging actuator to be engaged by the operator's foot when depressing the brake pedal of the automobile, an energizing unit for mounting on a trailing vehicle having a steering column, said energizing unit including an actuating lever, a link pivotally connected with said lever, a clamp for mounting on the brake pedal of the trailing vehicle, said link being pivoted to said clamp, the pivotal connections of said link, lever and clamp including a plurality of openings for selectively adjusting said energizing unit to different steering columns and brake pedals of trailing vehicles.

15. In a brake system, a power unit including a movable foot engageable actuator for engagement with the operator's foot when depressing the brake pedal of an automobile, an energizing unit mounted on a trailing vehicle, a clamp for mounting on the brake pedal of said trailing vehicle and a flexible operative connection between said power unit and said energizing unit.

ALFRED B. SEPPMANN.